Dec. 19, 1944.     J. E. E. EDVARSSON     2,365,256
SEPARATION OF EMULSIONS AND COLLOIDAL SOLUTIONS
Filed Jan. 6, 1944
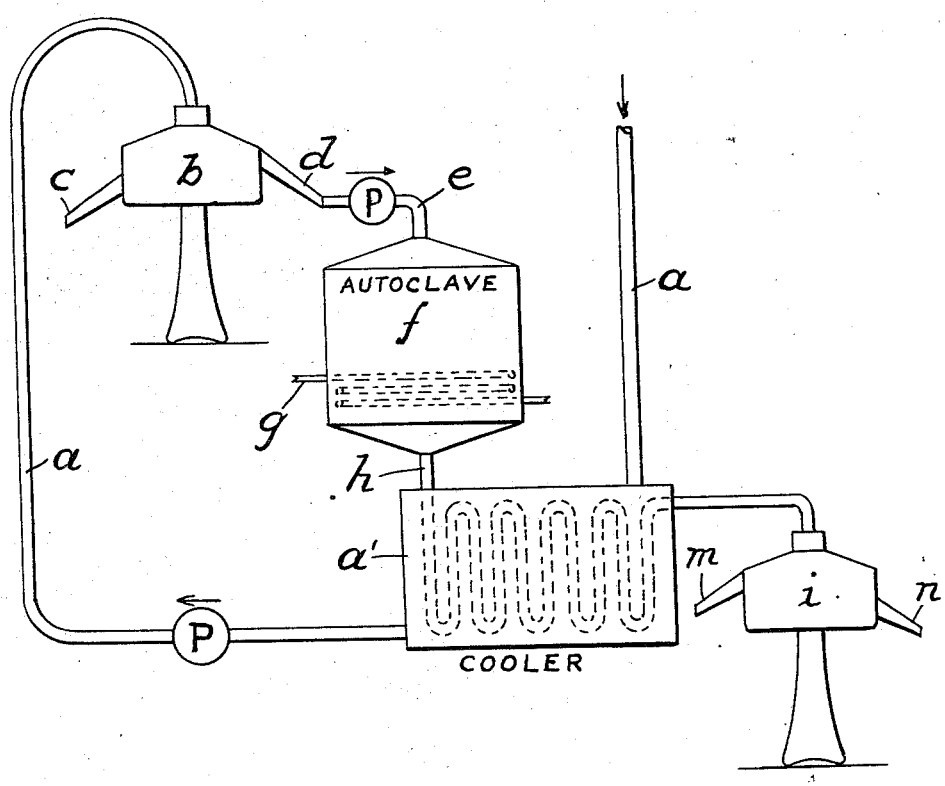
WITNESS:
INVENTOR
Johan Edvard Einar Edvarsson
BY
ATTORNEYS Patented Dec. 19, 1944

2,365,256

UNITED STATES PATENT OFFICE 2,365,256

SEPARATION OF EMULSIONS AND COLLOIDAL SOLUTIONS

Johan Edvard Einar Edvarsson, Stockholm, Sweden, assignor to Aktiebolaget Separator, Stockholm, Sweden, a corporation of Sweden Application January 6, 1944, Serial No. 517,228
In Sweden October 30, 1942

1 Claim. (Cl. 252—347)

Liquid mixtures often contain emulsions of the components present in the mixture. In many cases such emulsions may be broken by subjecting the mixture to treatment in a centrifugal separator, but in other cases it has been found impossible to break the emulsion by centrifugal force generated within practical limits. In the latter case chemicals must therefore be added, by which the emulsion is broken. The chemicals are generally added in the form of a solution, either prior to or during the centrifuging.

Colloidal solutions, for instance Diesel lubricants, switch oil, etc., containing colloidal carbon, are also very difficult to separate, and in order to enable the removal of the colloidal solids it is necessary to add a coagulating agent, usually a mixture of chemicals, by which the separation of the solids is facilitated, so that it can be effected in an ordinary centrifuge.

However, the treatment of oils, especially lubricating and insulating oils, with chemical solutions entails considerable disadvantages, because the solutions may easily, due to neglect or other circumstances, penetrate into the lubricating system in which it may cause disturbances in the operation and damages. In some cases, for instance on board a ship, it is also very difficult to make and work with chemical solutions.

It is known that if a stable emulsion is heated in an autoclave to a high temperature the emulsion is broken and that, if it is not subjected to too violent agitation, the emulsion is not reformed on cooling. Also, when colloidal suspensions are thus heated, a coagulation of the solid particles in suspension generally takes place, such conditions continuing after cooling. The ingredients of the emulsion or colloidal suspension, being of different specific gravities, are thereupon separable by the application of centrifugal force.

However, many mixtures containing emulsions or colloidal suspensions contain also other constituents. Thus the following mixtures are examples of those that often require separation:

1. A mixture of free water and an emulsion of oil and water, with possibly a minor proportion of free oil.
2. A mixture of oil and an emulsion of oil and water with possibly a minor proportion of free water.
3. Used Diesel lubricating oil containing colloidal carbon and mixed with heavier liquid or solid constituents (water and sludge).

In effecting separation of the oil and water of mixture No. 1, the mixture is first run into a centrifuge and the free water (the heaviest ingredient) therein separated from the emulsion and any minor proportion of free oil (the lighter ingredients). The lighter separated ingredients are then delivered to an autoclave, wherein they are heated to a temperature, in excess of 130° C., adequate to break the emulsion. When heated in an autoclave the resultant increase of pressure will retain the ingredients in liquid phase. The oil is then separated from the water by centrifugal force.

In effecting separation of the oil and water of mixture No. 2, the mixture is first centrifuged and the free oil (the lighter constituent) separated from the emulsion and any minor proportion of free water (the heavier ingredients). The heavier separated ingredients are then heated in an autoclave to a temperature, in excess of 130° C., adequate to break the emulsion. The oil and water are then centrifugally separated.

In treating mixture No. 3, the mixture is centrifuged to remove the sludge (the heavier components) from the colloidal solution or suspension (the lighter component) and the latter then heated to coagulate the solid particles, which are then separated out by centrifugal force.

The operation of the process is desirably a continuous one, especially when the process is practiced on board a ship, and wherever practiced certain precautions must be observed. Thus, owing to the relatively high pressure in the autoclave it is difficult to discharge the liquids continuously therefrom without an emulsion being re-formed. Further, before the liquids are fed into the centrifuge, they must be chilled to a temperature lower than their boiling point at atmospheric pressure. The discharge pipe of the autoclave should therefore extend thru or be provided with a refrigerating device. As refrigerating liquid the relatively cold liquid fed into the autoclave may advantageously be utilized, since thereby heat is saved and the dimensions of the autoclave may be reduced.

An arrangement for continuous discharge of the liquids from the autoclave may consist in constructing the discharge pipe in such a manner that the resistance therein is sufficiently high to ensure that the amount of liquid discharging per unit of time does not become larger than the thruput which should be used for the centrifuge. By this means considerable momentary drops of pressure and corresponding high velocities of flow are avoided, which could result in an emulsion being re-formed. The drop of pressure now becomes a continuous one and the rate of flow may be kept sufficiently low. By changing the length of the pipe line, the quantity of liquid flowing therethru may be varied.

It should be understood, however, that the practice of the process is not dependent upon the use of any particular apparatus, but by way of illustration, and not of limitation, I have illustrated in the drawing, in side elevation, an apparatus effective to carry out the process.

The mixture to be separated, which may be assumed to be an emulsion of oil and water mixed with free oil and a little water, is conveyed to a centrifugal separator $b$ through a closed pipe $a$. In the centrifuge $b$ the oil (the lighter component of the mixture) is separated from the emulsion and is discharged at $c$, while the emulsion, with the water, is discharged at $d$ and conveyed through a pipe $e$ to an autoclave $f$. The autoclave is heated (say by steam in pipes $g$) to a temperature, over 130° C., adequate to break the emulsion. Owing to the restricted outlet from the autoclave, the pressure builds up so as to hold the components of the emulsion mainly in liquid phase while the emulsion is broken down.

The components of the emulsion, now in a separated condition, flow out through pipe $h$, which is of such restricted diameter as to insure outflow at no greater velocity than the designed output of the centrifuge $i$ and of such length as to insure substantial reduction in temperature. In centrifuge $i$ the oil and water are separated and the water discharged through outlet $m$ and the oil through outlet $n$.

The gradual reduction in temperature and pressure of the mixture outflowing through pipe $h$ may be effected by enclosing the pipe in a cooler $a'$ interposed in the pipe $a$. The initial mixture, flowing toward the first centrifuge $b$ thus absorbs heat from the mixture flowing toward the final centrifuge $i$.

What I claim and desire to protect by Letters Patent is:

The herein described method of separating a mixture of two constituents of different specific gravities that are readily separable each from the other, one of the constituents, such as an emulsion or a colloidal suspension, being composed of components that, although of different specific gravities, are relatively inseparable from each other; said process comprising subjecting the said mixture to centrifugal force and thereby separating the two constituents of different specific gravities, heating that one of the separated constituents comprising the relatively inseparable components to a temperature higher than 130° C. under superatmospheric pressure until the relatively inseparable components are rendered separable, cooling the thus heated constituent while discharging it from the locus of heating toward a locus of reduced pressure under such limited velocity flow as to prevent reversion of said constituent to a condition in which its components are relatively inseparable, and subjecting the cooled constituent to centrifugal force and thereby effecting separation of the components of said constituent.

JOHAN EDVARD EINAR EDVARSSON.